United States Patent [19]

Murakami et al.

[11] Patent Number: 5,466,033
[45] Date of Patent: Nov. 14, 1995

[54] FRONT BODY STRUCTURE OF A VEHICLE AND A METHOD FOR ASSEMBLING A FRONT BODY OF A VEHICLE

[75] Inventors: Tetsuya Murakami; Masahiro Osumi; Toshisuke Nakanishi; Shigeaki Watanabe, all of Hiroshima, Japan

[73] Assignee: Mazda Motor Corporation, Hiroshima, Japan

[21] Appl. No.: 59,579

[22] Filed: May 12, 1993

[30] Foreign Application Priority Data

May 14, 1992 [JP] Japan .................... 4-121667

[51] Int. Cl.$^6$ .................... B62D 27/00; B60R 27/00
[52] U.S. Cl. .................... 296/189; 296/29; 296/194
[58] Field of Search .................... 296/188, 189, 296/193, 194, 203, 204, 29, 30

[56] References Cited

U.S. PATENT DOCUMENTS

| | | | |
|---|---|---|---|
| 3,795,410 | 3/1974 | Huber | 296/189 X |
| 3,848,886 | 11/1974 | Feustel et al. | 296/189 X |
| 4,657,301 | 4/1987 | Eger | 296/194 X |
| 5,125,715 | 6/1992 | Kijima | 296/194 X |
| 5,184,868 | 2/1993 | Nishiyama | 296/189 |
| 5,201,566 | 4/1993 | Mori | 296/194 X |

FOREIGN PATENT DOCUMENTS

| | | | |
|---|---|---|---|
| 2494204 | 5/1982 | France | 296/194 |
| 116268 | 7/1983 | Japan | 296/189 |
| 3-30224 | 6/1991 | Japan . | |
| 4008677 | 1/1992 | Japan | 296/188 |
| 4039172 | 2/1992 | Japan | 296/188 |
| 4050083 | 2/1992 | Japan | 296/189 |

*Primary Examiner*—Dean Kramer
*Attorney, Agent, or Firm*—Sixbey, Friedman, Leedom & Ferguson, Jr.; Gerald J. Ferguson, Jr.; Donald R. Studebaker

[57] ABSTRACT

A front body structure of a vehicle capable of controlling a crashed mode of a front side frame at a collision with reduced weight. A rear frame of the front side frame has high rigidity by making the thickness thereof thicker than that of the front frame. The weight of the front body is reduced by lessening the thickness of the front frame. A crashed mode is controlled by adjusting the thickness of the front frame and the rear frame. The front and rear frames are joined by a butt joint to each other at a set angle with respect to a vertical direction of a car body, so that a joint part between both frames can be easily bent at a collision. A reinforcement and a engine mount are respectively disposed at the inside and the outside of the joint part to reinforce the joint part.

17 Claims, 5 Drawing Sheets

FRONT BODY STRUCTURE OF A VEHICLE AND A METHOD FOR ASSEMBLING A FRONT BODY OF A VEHICLE

BACKGROUND OF THE INVENTION

This invention relates to a front body structure of a vehicle in which a front side frame has a front frame and a rear frame, and relates to a method for assembling the front body of the vehicle.

In order to ensure a performance against a collision of a vehicle by enhancing a shock absorbing efficiency, there has been a car body structure that in a crashed part of a front side frame, a rear frame or the like, plural reinforcements are arranged inside the frame to control durability and a crashed mode of the frame.

Such a car body structure, however, has a problem that a welding work for mounting the plural reinforcements inside of the frame is troublesome. Further, in the structure, the thickness of the frame is uniform to reduce the sorts of the materials to be used, and is determined according to a part with high rigidity thereof. This increases the strength and the weight of the frame excessively.

Proposed is a front body structure of a vehicle, as disclosed in Japanese Utility Model Registration Publication Gazette No. 3-30224, wherein a front side member is at first divided into two members in a longitudinal direction of a car body, a pile part in which the divided two members are piled is provided at a part thereof to which an engine mount bracket is mounted, and then the engine mount bracket is removably disposed at the pile part.

In such a structure, however, it is required that the divided members are jointed to each other. This causes the increase of parts and the difficulty of manufacturing.

SUMMARY OF THE INVENTION

This invention has its object of providing a front body structure of a vehicle and a method for assembling the front body of the vehicle, which are capable of controlling a crashed mode of a frame while reducing the weight thereof compared with a case with entirely thick frame, by thickening only a part which requires high rigidity in the frame.

To attain the foregoing object, in the present invention, a front body structure of a vehicle having a front side frame comprises: a front frame composing a front part of the front side frame; and a rear frame composing a rear part of the front side frame, having higher rigidity than the front frame, and a front end part of which is joined by a butt joint to a rear end part of the front frame. According to such a structure, the rear frame of the front side frame has higher rigidity than the front frame, so that, the rigidity of the front side frame is different between the front and the rear thereof, and a joint part between the front and rear frames is joined by a butt joint. As a result, the front side frame easily bends at the joint part at a collision, thus effectively absorbing a shock.

Further, in the present invention, the front end part of the rear frame is joined by a butt joint to the rear end part of the front frame at a set angle with respect to a vertical direction of a car body.

Since the front frame and the rear frame are joined by a butt joint at a set angle with respect to a vertical direction of a car body, the front side frame easily bends at the joint part between the front and rear frames at a collision. This presents an advantage at absorbing a shock.

Furthermore, in the present invention, a front body structure of a vehicle having a front side frame comprises: a front frame composing a front part of the front side frame; a rear frame composing a rear part of the front side frame and being joined by a butt joint to the front frame; and a reinforcement arranged at least at one of the inside and the outside of a joint part between the front frame and the rear frame. According to such a structure, required strength of the joint part between the front and rear frames is ensured.

For example, when a reinforcement and an engine mount are respectively arranged inside and outside of the joint part between the front and rear frames, the joint part is supported between the reinforcement and the engine mount. As a result, the joint part between the front and rear frames is prevented from separating and the rigidity for supporting an engine is ensured by the engine mount.

Moreover, in the present invention, a front body structure of a vehicle having a front side frame comprises: a front frame composing a front part of the front side frame; a rear frame composing a rear part of the front side frame, having higher rigidity than the front frame, and a front end part of which is joined by a butt joint to a rear end part of the front frame at a set angle with respect to a vertical direction of a car body; a reinforcement arranged at the inside of a joint part between the front frame and the rear frame; and an engine mount disposed at the outside of the joint part between the front frame and the rear frame. Accordingly, since the rear frame has higher rigidity than the front frame and the front and rear frames are joined to each other by a butt joint at a set angle with respect to a vertical direction of a car body, the front side frame easily bends at the joint part at a collision so that a shock of the collision is effectively absorbed. Since the reinforcement and the engine mount are respectively arranged inside and outside of the joint part between the front and rear frames, the joint part is prevented from separating and the rigidity for supporting the engine is ensured by the engine mount.

In addition, in the present invention, a method for assembling a front body of a vehicle in which a front side frame in closed sectional construction composed of a frame inner and a frame outer joined to each other has a front frame and a rear frame comprises the steps of: forming a joint panel member in such a manner as to join by a butt joint a first panel member forming the front frame to a second panel member forming the rear frame whose rigidity is higher than that of the first panel member; and forming the frame inner and the frame outer of the front side frame by pressing the joint panel member. Since the first panel member forming the front frame is joined by a butt joint to the second panel member forming the rear member with higher rigidity than that of the front member, the joint panel member having different rigidity between the front and the rear thereof can be easily formed. Since the joint panel member is then pressed to form the frame inner and the frame outer of the front side frame, the front side frame having different rigidity between the front and rear members can be easily manufactured by joining the frame inner to the frame outer.

Other features and advantages of the invention will be apparent from the following description.

BRIEF DESCRIPTION OF THE DRAWINGS

Accompanying drawings show a preferred embodiment in the present invention in which.

DESCRIPTION OF THE PREFERRED EMBODIMENT

Detailed description is made below about a preferred embodiment according to the present invention with reference to accompanying drawings.

Figure 1:
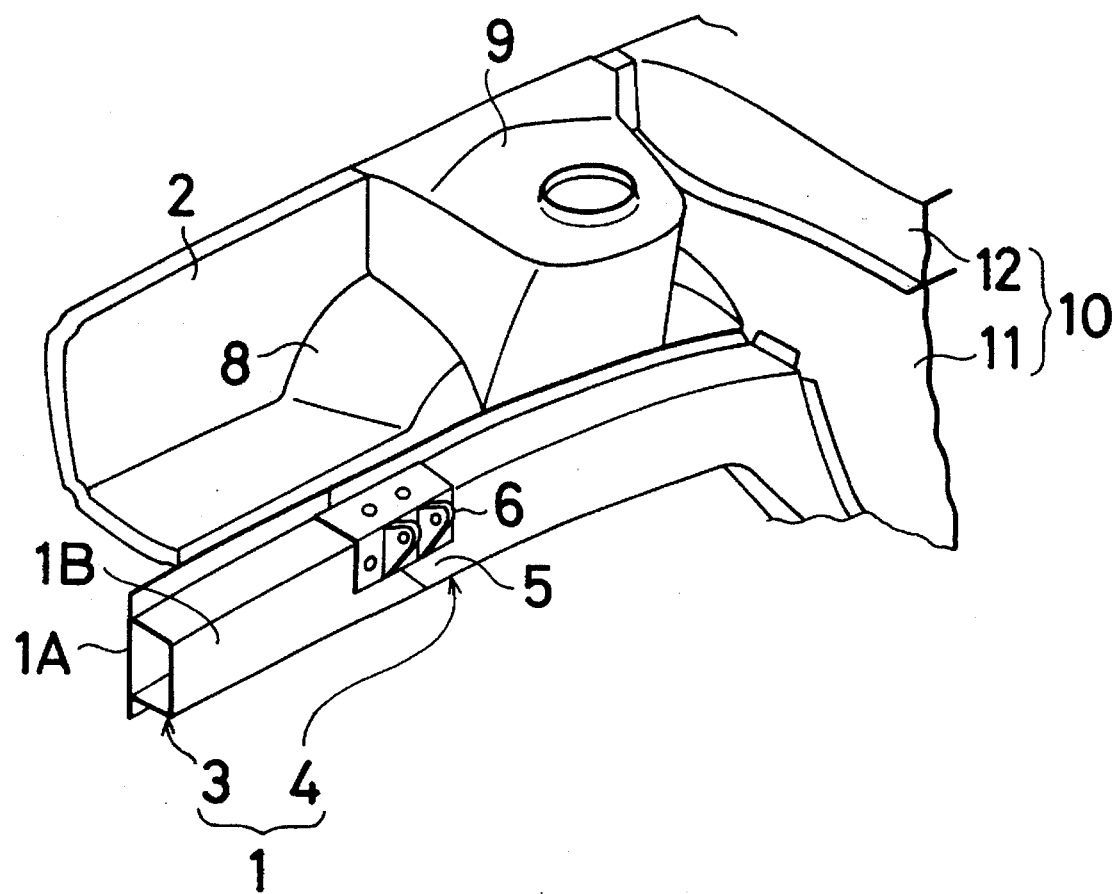
FIG. 1 is a perspective view showing a front body structure of a vehicle.
Figure 2:
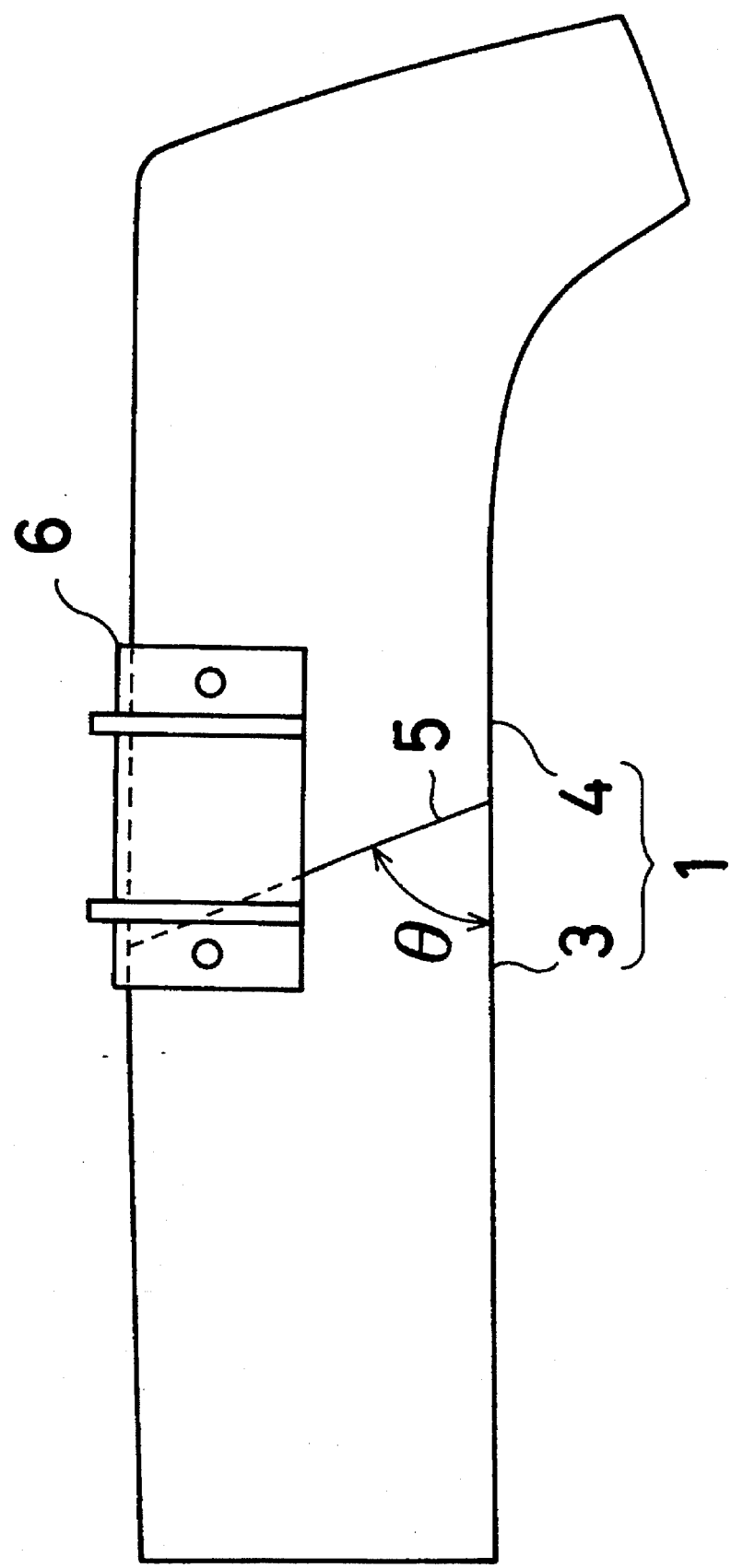
FIG. 2 is a side view of a front side frame.

In FIG. 1 schematically showing a front body structure of a vehicle, reference numeral 1 indicates a front side frame extending in a longitudinal direction of a car body which is jointed to an under side part of a wheel apron 2 composing a side part of an engine room. The front side frame 1 has a front frame 3 composing a front part thereof and a rear frame 4 composing a rear part thereof. The front frame 3 and the rear frame 4 are integrally joined by a butt joint by a laser beam welding at a set angle with respect to a vertical direction of a car body. In this embodiment, a joint part 5 between the frames 3 and 4 is inclined at 30° with respect to a vertical direction of a car body (θ=60 with respect to a longitudinal direction of a car body) (see in FIG. 2).

Figure 3:
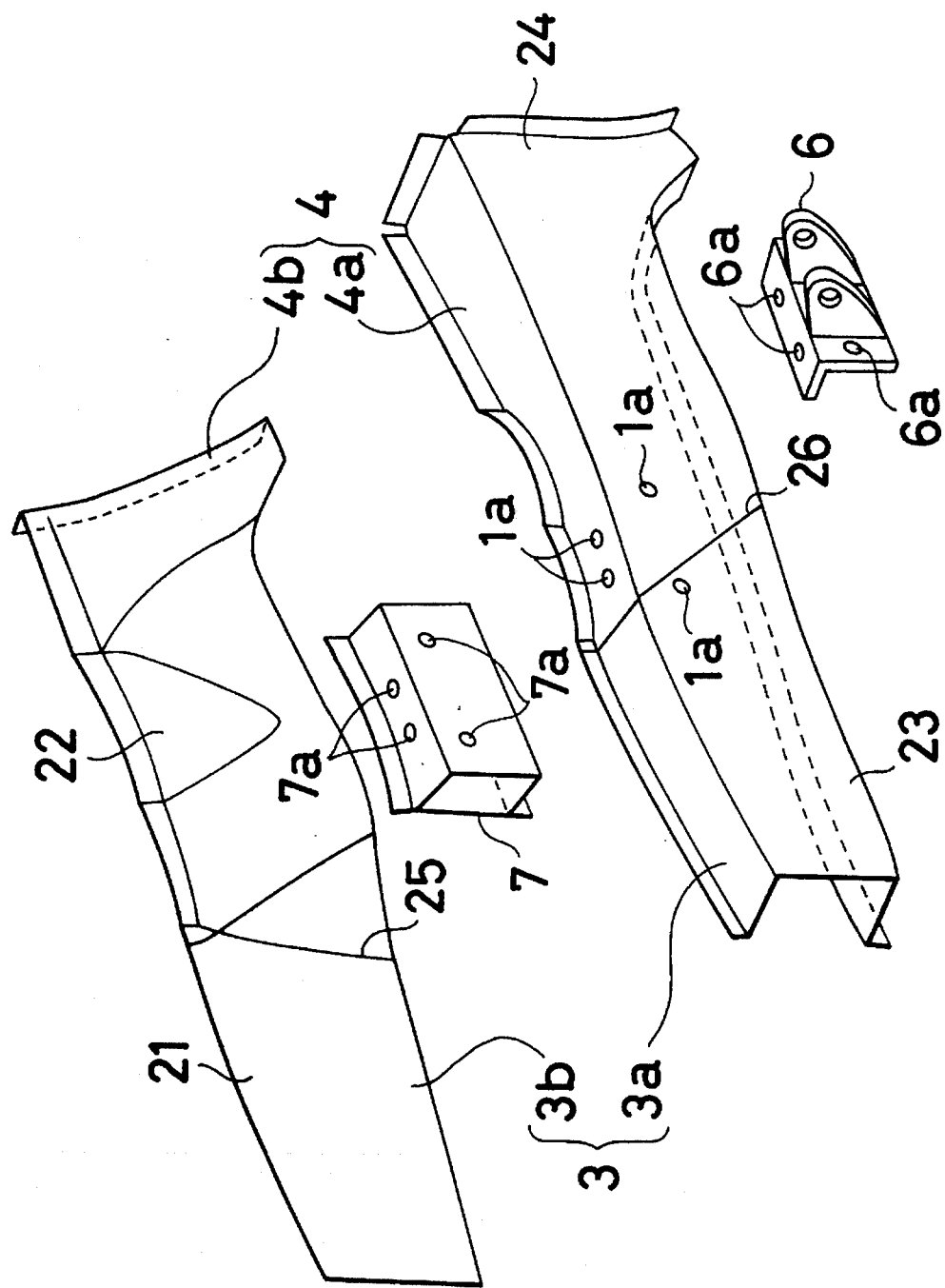
FIG. 3 is a perspective view of the front side frame in parts.

Further, as shown in FIG. 3, an engine mount 6 for supporting an engine (not shown) is disposed outside of the joint part 5 of the front side frame 1 and a reinforcement 7 in which two panels are joined in a closed sectional construction to each other is disposed inside thereof. Mounting holes 6a, 7a are formed at the engine mount 6 and the reinforcement 7 respectively. Mounting holes 1a are formed at the front side frame 1 so as to correspond to the mounting holes 6a and 7a. The front side frame 1 is fixed to the engine mount 6 and the reinforcement 7 by bolts (not shown) passing through the front and rear frames 3, 4, the reinforcement 7 and the engine mount 6. Thus, the joint part 5 between the front and rear frames 3, 4 is reinforced by the engine mount 6 and the reinforcement 7, thus preventing a separation of the joint part 5.

The reinforcement 7 is attached to the front and rear frames 3, 4 so that a contacting space between the reinforcement 7 and the front frame 3 is smaller than a contacting space between the reinforcement 7 and the rear frame 4.

Preferably, the number of the bolt which passed through the rear frame 4 is more than the number of the bolt which passes through the front frame 3.

Reference numerals 8, 9 and 10 indicate a wheel house, a suspension tower part and a dash panel respectively. The dash panel 10 is composed of a dash lower panel 11 located at a lower side and a dash upper panel 12 located at a upper side.

The front frame 3 has a simple figure, and has a thinner thickness and a lower rigidity than the rear frame 4 in order to easily absorb a shock by deformation at a head-on collision. For example, as the front frame 3, a material of 1.4 mm thickness and 80 kgf/mm² maximum tensile stress (high-tensile steel board such as SPFC80) is used, and, as the rear frame 4, a material of 2.4 mm thickness and 40 kgf/mm² maximum tensile stress (ordinary steel board such as SPFC40) is used. The joint part 5 (joint line) between both frames 3 and 4 is joined by a butt joint so as to be inclined at from 45° to 60° with respect to a vertical direction of a car body (so that the upper the joint line goes, the more frontward the joint line is located with respect to a vehicle forwardly running direction).

The front side frame 1 has a closed sectional construction in which a frame outer 1A in plate shape and a frame inner 1B in hut shape are integrally jointed at upper flange parts and lower flange parts thereof by spot welding. The frame outer 1A is composed of an integral joint panel member which is so composed that two panel members 21, 22 whose thickness are different from each other are joined by a butt joint at a joint part 25 by laser beam welding beforehand. Similarly, the frame inner 1B is composed of an integral joint panel member which is so composed that two panel members 23, 24 whose thickness are different from each other are joined by a butt joint at a joint part 26 by laser beam welding before-hand. The joint panel members are pressed beforehand to be formed in a set figure.

Figure 4:
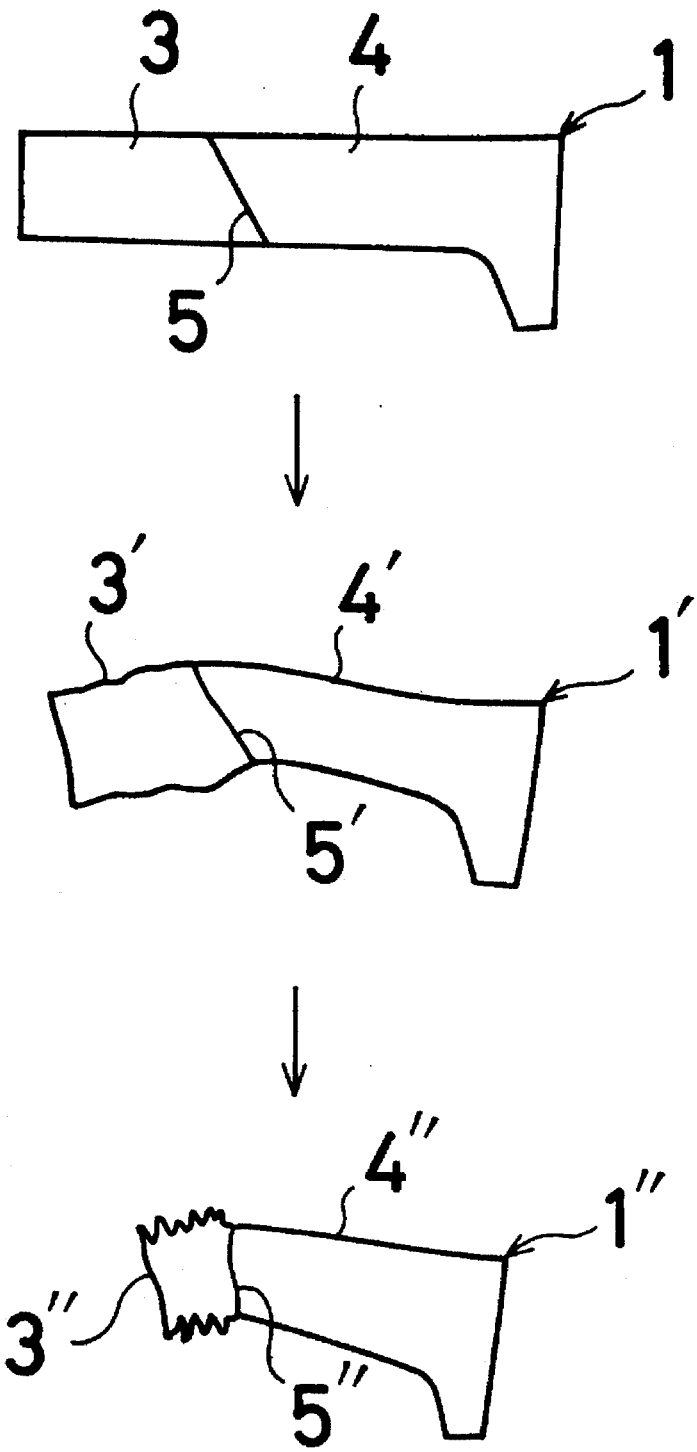
FIG. 4 is an explanatory diagram showing a state of transformation of the front side frame at a crash.

Accordingly, for example as shown in FIG. 4, when a impact from a bumper or the like is inputted at a head-on collision, the impact works so as to bend the front side frame 1 upward at the joint part 5. In detail, when the impact is inputted via the front frame 3 at a head-on collision, the rear frame 4 works so as to prop against the front frame 3, since the thickness of the front frame 3 is thinner than that of the rear frame 4 and the joint part 5 is inclined at a set angle with respect to a vertical direction of a car body. As a result, the front side frame 1 bends so that the joint part 5' between the front frame 3' and the rear frame 4' shifts upward.

Further, since the rear frame 4' props against the front frame 3' to which the impact is inputted and the front frame 3' located frontward than the engine mount 6 has lower rigidity than the rear frame 4', the front frame 3" transforms in bellows shape and the joint part 5" further raises upright. Accordingly, a shock energy is effectively absorbed without the engine (the engine mount 6) moved backward and without increasing the weight. Particularly, since desired strength and rigidity of the front side frame are ensured by changing the reinforcement 7, a balance of energy absorption of a front part and a rear part of the frame is not affected by the strength and rigidity of the front side frame.

Furthermore, since the front frame 3 can be made thin to required minimum thickness, a weight of the front side frame can be reduced compared with a conventional front side frame whose thickness is uniform as a whole.

Figure 5:
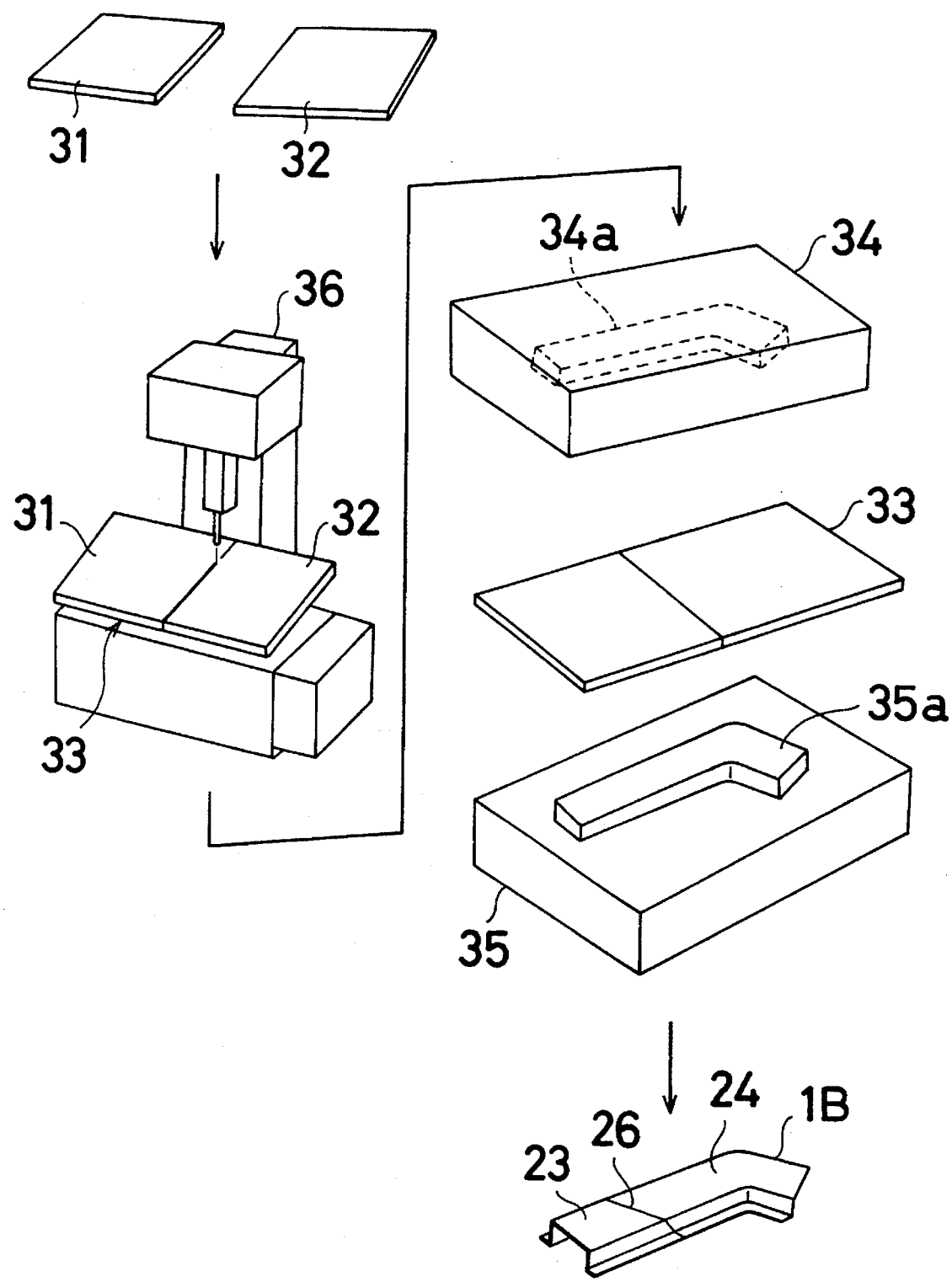
FIG. 5 is a perspective view illustrating a method for assembling a front body of a vehicle.

Explained next is a method for assembling the above front body of a vehicle with reference to FIG. 5.

First, two panel members 31, 32 which have different thickness and different rigidity from each other are prepared. The panel members 31, 32 are joined by a butt joint by a laser beam welding machine 36. Thus, formed is a joint panel member 33 in which the panel members 31, 32 whose thickness are different from each other are integrally formed.

Then, a frame outer 1B having a set figure is formed from the joint panel member 33 by using a press upper mold 34 having a molding concave part 34a and a press lower mold 35 having a molding convex part 35a. Thus, in the frame outer 1B, the thickness of the rear side panel member 24 is thicker than that of the front side panel member 23 and a rear part of the front side frame 1 has high rigidity. Accordingly, by pressing one element (a joint panel member 33) one time, the frame outer 1B in which the thickness of the rear part (a panel member 24) is thicker than that of the front part (a panel member 23) is easily molded.

At this time, the frame outer 1B is so pressed that the joint part 26 between both panel members 23, 24 makes a set angle (for example, 45° to 60°) with respect to a horizontal direction.

Then, in the same way as in molding of the frame outer 1B, formed is the frame inner 1A in which the panel members 21, 22 whose thickness are different from each other are welded by laser beam.

Thereafter, a reinforcement 7 is welded to an inner surface side of the frame inner 1A, then the frame inner 1A and the frame outer 1B are joined to each other by spot welding to form the front side frame 1 in which the rear frame 4 has higher rigidity than the front frame 3. If required, the engine mount 6 is fixed by bolts (not shown).

This invention can be embodied as various forms without deviating from its fundamental characteristics. Thus, the above embodiment is for purpose of illustration only and is not intended as a definition of the limits of the invention. In addition, since the scope of this invention is determined not by the description made before the claims but by the scope of the claims, all of modifications within the scope of the claims or equivalents to the scope of the claims are included in the scope of the claims.

We claim:

1. A front body structure of a vehicle having a front side frame positioned at a lower side of a wheel apron forming a side part of an engine room and extending substantially straight in a longitudinal direction of the vehicle, comprising:

a front frame composing a front part of said front side frame, said front frame extending in a substantially longitudinal direction of the vehicle; and a rear frame composing a rear part of said front side frame, said rear frame having a higher rigidity than said front frame with said rear frame extending in a substantially longitudinal direction of the vehicle, wherein each of said front frame and said rear frame have closed cross-sections and an open part of a front end part of said rear frame is joined by a butt joint to an open part of a rear end part of said front frame.

2. The front body structure of a vehicle as in claim 1, wherein the front end part of said rear frame is joined by a butt joint to the rear end part of said front frame at a set angle with respect to a vertical direction of a car body.

3. The front body structure of a vehicle as in claim 2, wherein the angle of said butt joint between said front frame and said rear frame increases with respect to the vertical direction of the car body, the more forward the joint line is located with respect to a vehicle forwardly running direction.

4. A front body structure of a vehicle having a front side frame positioned at a lower side of a wheel apron forming a side part of an engine room and extending substantially straight in a longitudinal direction of the vehicle, comprising:

a front frame composing a front part of said front side frame, said front frame extending in a substantially longitudinal direction of the vehicle;

a rear frame composing a rear part of said front side frame, said rear frame extending in a substantially longitudinal direction of the vehicle; and a reinforcement arranged at least at one of an inside and an outside of a joint part between said front frame and said rear frame;

wherein each of said front frame and said rear frame have closed cross-sections and an open part of a front end part of said rear frame is joined by a butt joint to an open part of a rear end part of said front frame.

5. The front body structure of a vehicle as in claim 4, wherein said reinforcement is attached to said front and rear frames so that a contacting space between said reinforcement and said front frame is smaller than a contacting space between said reinforcement and said rear frame.

6. The front body structure of a vehicle as in claim 4, wherein said reinforcement is attached to said front and rear frames by bolts passing through said front and rear frames and said reinforcement, with a number of bolts passing through said rear frame being greater than a number of bolts passing through said front frame.

7. A front body structure of a vehicle having a front side frame, comprising:

a front frame composing a front part of said front side frame;

a rear frame composing a rear part of said front side frame, having higher rigidity than said front frame, and a front end part of which is joined by a butt joint to a rear end part of said front frame at a set angle with respect to a vertical direction of a car body;

a reinforcement arranged at the inside of a joint part between said front frame and said rear frame; and an engine mount disposed at the outside of the joint part between said front frame and said rear frame.

8. The front body structure of a vehicle as in claim 7, wherein the angle of said butt joint between said front frame and said rear frames increases with respect to the vertical direction of the car body, the more forward the joint line is located with respect to a vehicle forwardly running direction.

9. The front body structure of a vehicle as in claim 7, wherein said reinforcement is attached to said front and rear frames so that a contacting space between said reinforcement and said front frame is smaller than a contacting space between said reinforcement and said rear frame.

10. The front body structure of a vehicle as in claim 7, wherein:

said reinforcement and said engine mount are attached to said front and rear frames by bolts passing through said front and rear frames, said reinforcement and said engine mount; and a number of bolts passing through said rear frame is greater than a number of bolts passing through said front frame.

11. A method for assembling a front body of a vehicle in which a front side frame, in closed sectional construction is composed of a frame inner portion and a frame outer portion joined to each other, is divided into a front frame and a rear frame, said method comprising the steps of:

forming a joint panel member in such a manner as to join by a butt joint a first panel member forming said front frame to a second panel member forming said rear frame whose rigidity is higher than that of the first panel member; and forming said frame inner portion and said frame outer portion of said front side frame by pressing said joint panel member.

12. The method for assembling a front body of a vehicle according to claim 11, further comprising the step of attaching the frame inner portion to the frame outer portion by welding.

13. The method for assembling a front body of a vehicle according to claim 12, wherein the welding is spot welding.

14. A front body structure of a vehicle having a from side frame extending in a substantially longitudinal direction of the vehicle, comprising:

a front frame composing a front part of said front side frame, said front frame extending in a substantially longitudinal direction of the vehicle;

a rear frame composing a rear part of said front side frame and being joined by a butt joint to said from frame, said rear frame extending in a substantially longitudinal direction of the vehicle; and a reinforcement arranged at least at one of an inside and an outside of a joint part between said front frame and said rear frame;

wherein said reinforcement is arranged at an inside of the joint part between said front frame and said rear frame and an engine mount is arranged at an outside of the joint pan between said front frame and said rear frame.

15. The front body structure of a vehicle as in claim 14, wherein:

said reinforcement and said engine mount are attached to said front and rear frames by bolts passing through said front and rear frames, said reinforcement and said engine mount; and a number of bolts passing through said rear frame is greater than a number of bolts passing through said front frame.

16. A front body structure of a vehicle having a front side frame positioned at a lower side of a wheel apron forming a side part of an engine room and extending substantially straight in a longitudinal direction of the vehicle, comprising:

a front frame composing a front part of said front side frame, said front frame extending in a substantially longitudinal direction of the vehicle; and a rear frame composing a rear part of said front side frame, said rear frame having a higher rigidity than said front frame with said rear frame extending in a substantially longitudinal direction of the vehicle, wherein each of said front frame and said rear frame have closed cross-sections and an open part of a front end part of said rear frame is joined by a butt joint to an open part of a rear end part of said front frame; and a thickness of said rear frame is greater than a thickness of said front frame.

17. A method for assembling a front body of a vehicle in which a front side frame, in closed sectional construction is composed of a frame inner portion and a frame outer portion joined to each other, is divided into a front frame and a rear frame, said method comprising the steps of:

forming a joint panel member in such a manner as to join by a butt joint a first panel member forming said front frame to a second panel member forming said rear frame whose rigidity is higher than that of the first panel member; and forming said frame inner portion of said front side frame by pressing said joint panel member after joining said joint panels.

* * * * *